Figures 1, 2, 3:
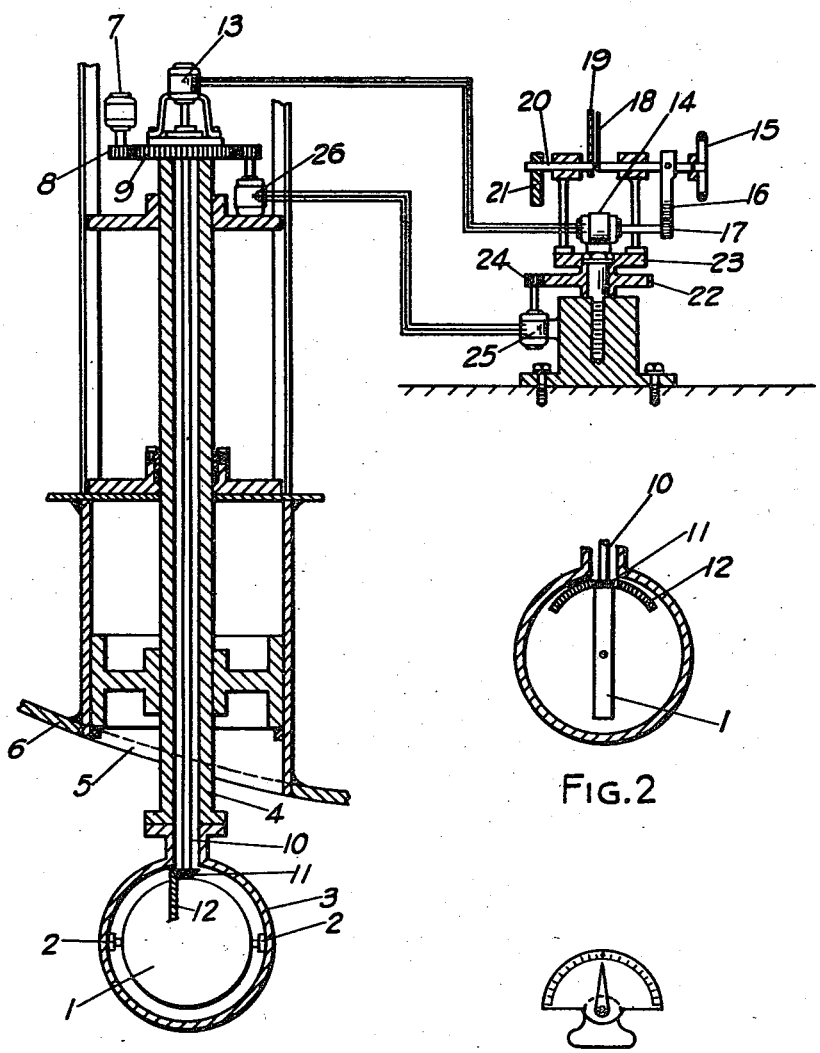

Sept. 2, 1947.   R. L. WILLIAMS   2,426,657
APPARATUS FOR DIRECTIONAL SIGNALING
Filed Oct. 12, 1942   6 Sheets-Sheet 1

INVENTOR
ROBERT L. WILLIAMS
BY
ATTORNEY

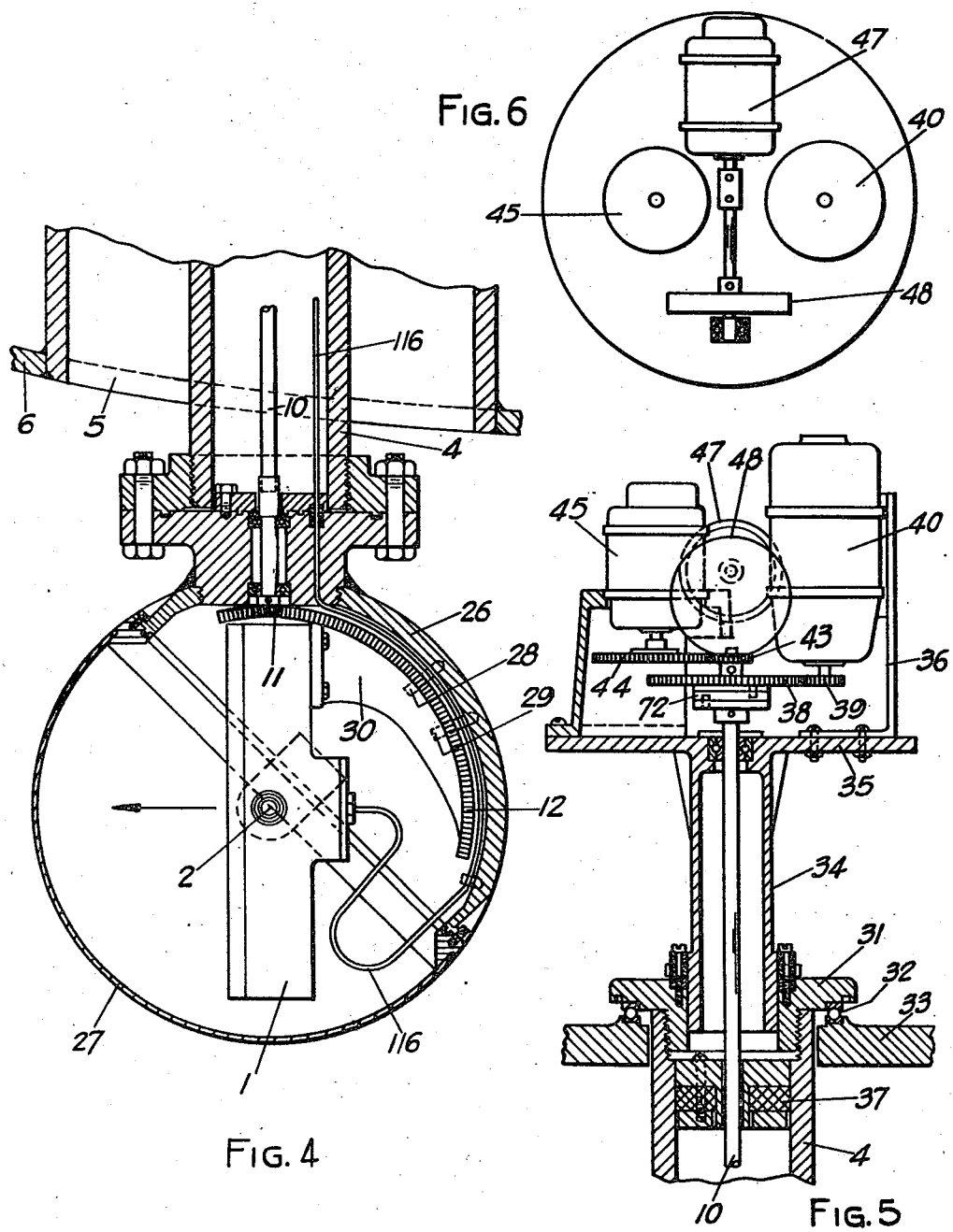

Sept. 2, 1947.   R. L. WILLIAMS   2,426,657
APPARATUS FOR DIRECTIONAL SIGNALING
Filed Oct. 12, 1942   6 Sheets-Sheet 3

INVENTOR
ROBERT L. WILLIAMS
BY
ATTORNEY

Sept. 2, 1947. R. L. WILLIAMS 2,426,657
APPARATUS FOR DIRECTIONAL SIGNALING
Filed Oct. 12, 1942 6 Sheets-Sheet 5
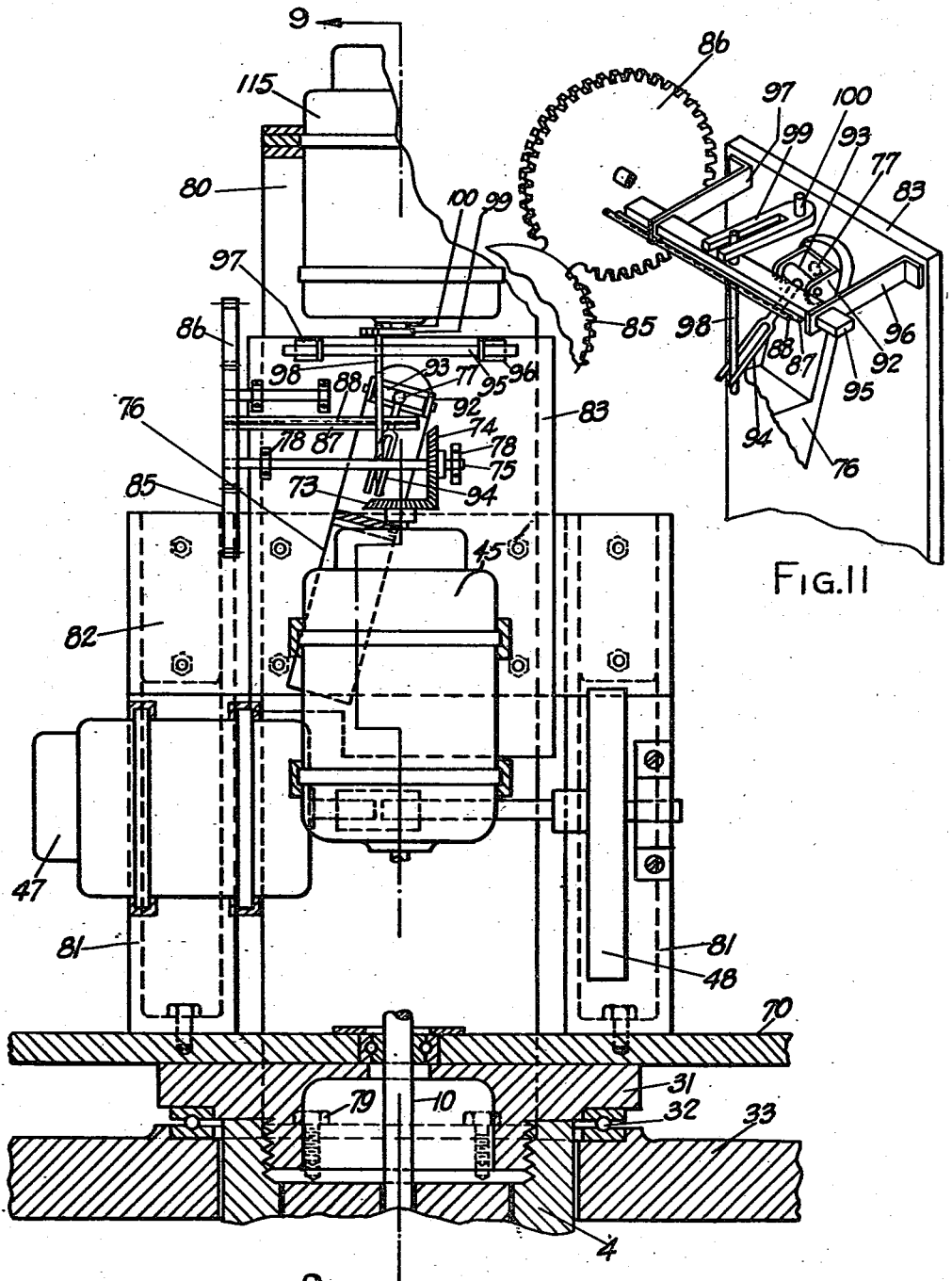
INVENTOR
ROBERT L. WILLIAMS
BY
ATTORNEY Patented Sept. 2, 1947

2,426,657

UNITED STATES PATENT OFFICE 2,426,657

APPARATUS FOR DIRECTIONAL SIGNALING

Robert Longfellow Williams, Newton, Mass., assignor, by mesne assignments, to Submarine Signal Company, Boston, Mass., a corporation of Delaware Application October 12, 1942, Serial No. 461,816

19 Claims. (Cl. 177—386)

The present invention is a continuation-in-part of the application of Robert L. Williams Serial No. 40,587, filed September 14, 1935, for Apparatus for submarine signaling, which matured into Patent No. 2,407,697.

The present invention relates to improvements in apparatus for submarine signaling. More particularly the present invention relates to apparatus for controlling the position of and for mounting a submarine signaling device, such as a wave energy sender or receiver.

The present invention also relates to apparatus for indicating the position of such a submarine signaling device.

For some purposes it is desirable to mount submarine signaling apparatus, such as sending or receiving devices, on a ship so that they may be projected through a suitable opening in the skin of the ship into the water beneath. This type of mounting is particularly advantageous for high frequency compressional wave producing and receiving devices. Devices of this type are generally called "oscillators" or "projectors" and their radiating faces usually have dimensions large compared to the wave length so that they send or receive compressional waves in a well-defined beam. Such arrangements are used for communication purposes between ships, for echo ranging and for other purposes. For this reason the projector is usually mounted on a rigid rotatable support so that its radiating face may be turned about a vertical axis to face in any desired direction.

It will be evident, however, that if the ship rolls, the axis of the wave beam which is being produced or along which reception takes place will not remain horizontal or in its normal plane, but will be tipped at an angle to the horizontal and raised or lowered from its normal position. Furthermore, the roll of the ship will not only throw the sound beam up and down, but will also deflect the beam sidewise. Both communication and echo ranging are difficult under such conditions.

Furthermore, water conditions are sometimes encountered where the temperature gradient is such as to cause a deflection of the compressional wave energy from a straight line and to make it take an upwardly or downwardly curved path. With the usual type of mounting such as has been described above, the range through which signaling may be successfully accomplished will be considerably reduced under such water conditions.

One feature of the present invention is the provision of means for positively controlling the position of the radiating face of the projector with respect to the vertical. A further feature of the present invention is the provision of means for indicating the angle to which the projector has been tilted with respect to the ship. A still further feature of the present invention is the provision of means for indicating the true azimuthal direction and tilt from the horizon of the directional axis of the oscillator when the ship rolls.

Figure 7:
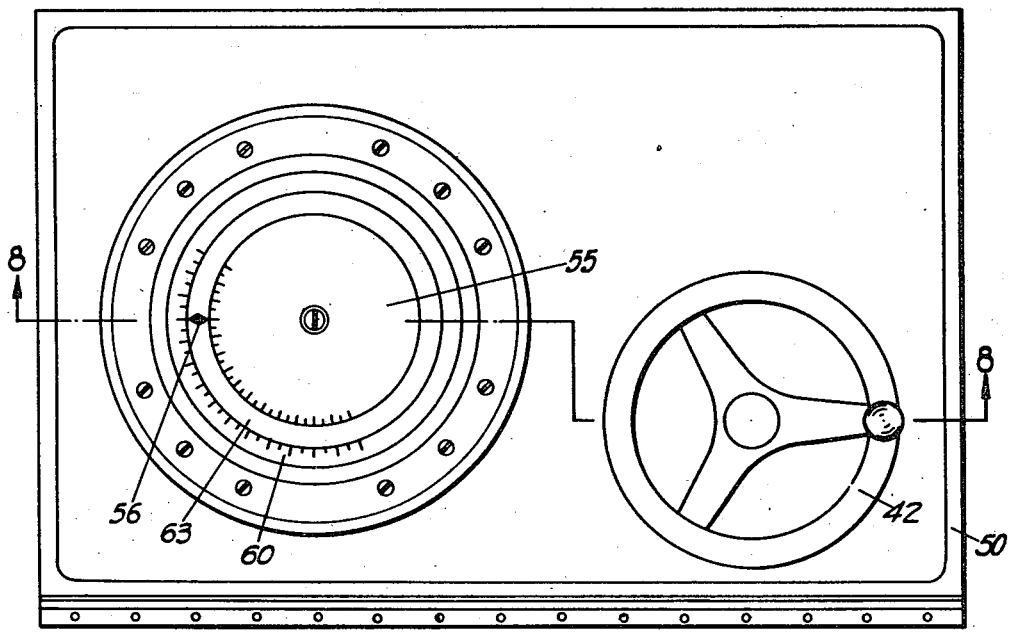
Figure 8:
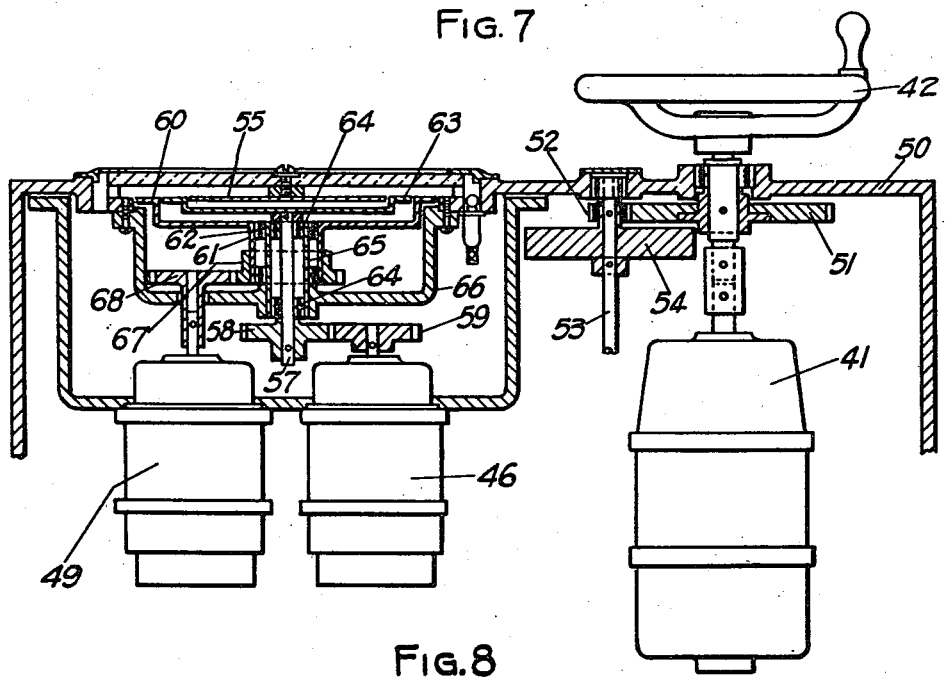
Figure 9:
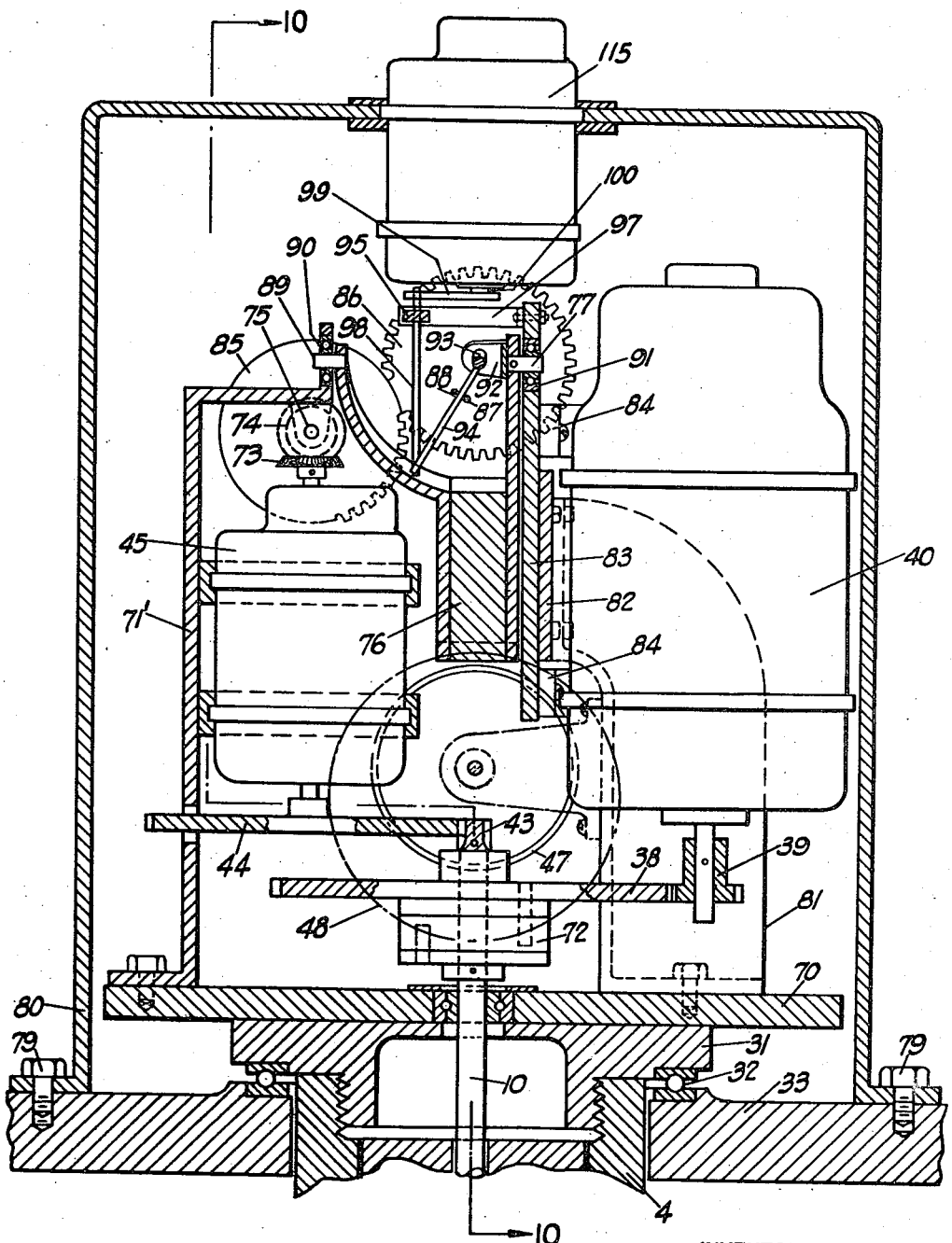
Figure 12:
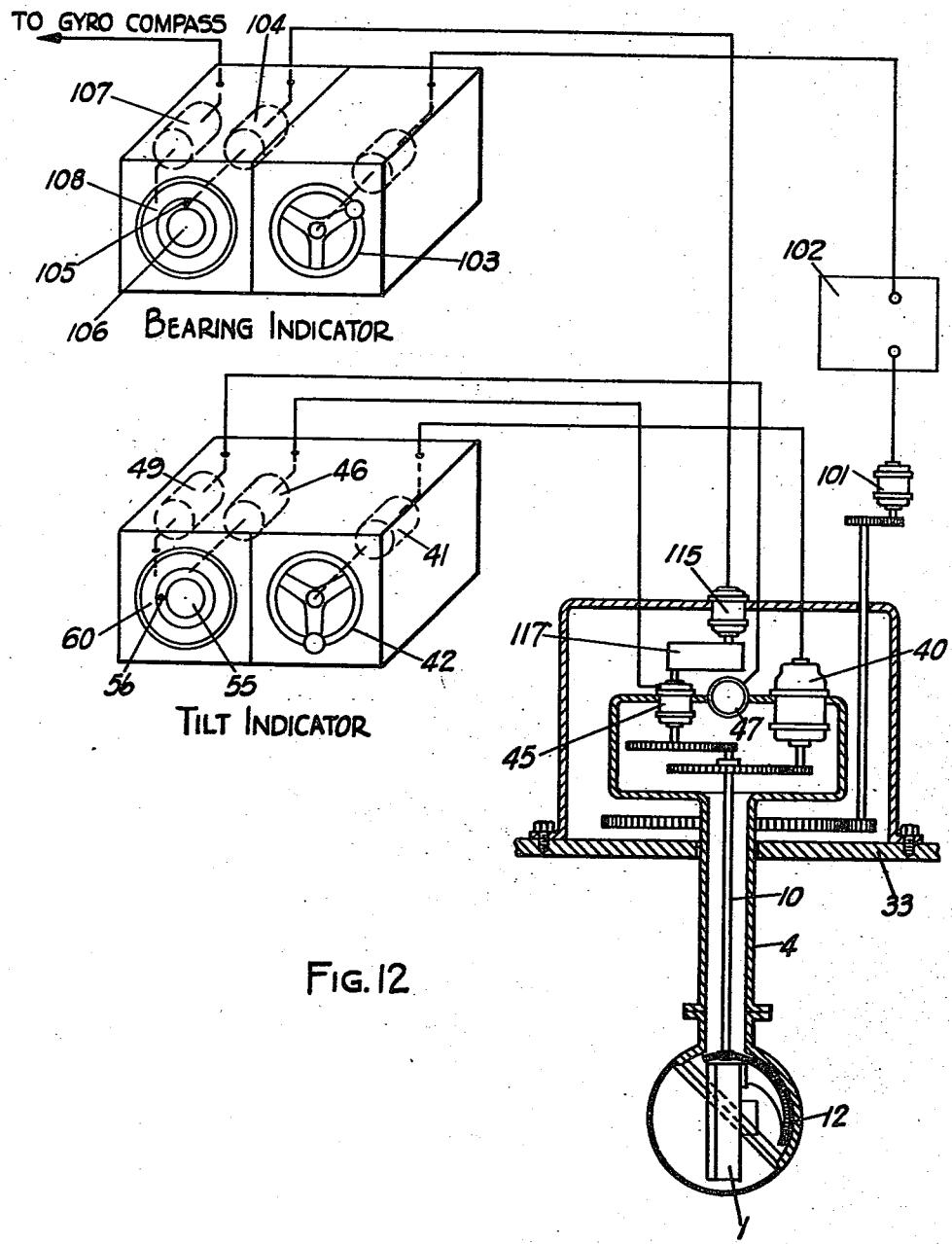

Other features of the invention will appear from the following description taken in connection with the accompanying drawings in which Fig. 1 shows a projector mounting in accordance with the present invention as well as a means for indicating the angular position of the projector with respect to the vertical; Fig. 2 is an end view of the projector shown in Fig. 1; Fig. 3 is a detail of the dial and pointer shown in Fig. 1; Fig. 4 is an enlarged sectional view of the projector mounting shown in Fig. 1; Fig. 5 is a section view of a mechanism for tilting the projector according to the invention; Fig. 6 is a plan view of the mechanism shown in Fig. 5; Fig. 7 is an elevation of a tilt indicator and tilt-control device; Fig. 8 is a horizontal partial section through the device shown in Fig. 7; Fig. 9 is a partial vertical section of a modification involving a combined tilt and azimuth bearing repeater mechanism; Fig. 10 is a partial vertical section of the arrangement shown in Fig. 9 taken at right angles thereto; Fig. 11 is a perspective view of a portion of the mechanism shown in Figs. 9 and 10; and Fig. 12 is a schematic diagram of a complete tilt and azimuth indicating system.

Fig. 1 shows a front view of a projector 1 for sending and receiving compressional wave energy. The projector 1 is constructed to have a directional characteristic whereby it transmits a beam of compressional waves and similarly may receive from a single direction. This may be accomplished, as is well known in the art, by making the projector's radiating face have a diameter large compared to the wave length of the compressional waves. The projector is supported on pivots 2 within a spherical shell or dome 3 which is mounted at the end of a hollow shaft 4 arranged so that it may be raised or lowered through an aperture 5 in the skin 6 of a ship. The shaft 4 and thereby the projector 1 may be rotated by the motor 7 through the gears 8 and 9 whereby the directional axis of the projector is rotated in azimuth. The motor 7 may be operated from any suitable source of power, the controls for which are conveniently placed at a remote control station.

Within the shaft 4 is a second shaft 10 at whose lower end is mounted a bevel gear 11 meshing with an arcuate rack or gear section 12. The latter is mounted on the projector so as to rotate the projector when the shaft 10 is turned. The shaft 10 is rotated by means of motor 13 which is preferably a self-synchronous receiver motor operated by a self-synchronous transmitting generator 14 which, in turn, is manually operated by the handwheel 15 through a sector gear 16 and pinion gear 17. All of these are preferably mounted at the control station. The handwheel 15 is also connected to a pointer 18 mounted in front of, but independent from, a dial 19. The dial 19 is mounted on a shaft 20 at the end of which there is mounted a compound pendulum 21 whereby the dial is rotated with the shaft 20 when the ship rolls. This entire assembly is mounted on a table 23 rotatable in azimuth through gears 22 and 24. The gear 24 is operated by a self-synchronous receiver motor 25 which, in turn, is energized by a self-synchronous transmitting generator 26 operated from the gear 9 which rotates with the projector in azimuth.

Since the pointer 18 is arranged to have the same angular motion as the angle of tilt of the projector 1 and the dial 19 to have the same angular motion as the component of angular roll of the ship in the plane of the projector diaphragm, it will be evident that the pointer 18 will always indicate the correct angle of tilt of the directional axis of the projector 1 with respect to the horizon. It will be noted that this indication of the true angle of tilt is possible only because the roll indicator represented by the dial 19 and the pendulum 21 are mounted on a rotating table which always maintains a position corresponding to the direction in which the radiating surface of the projector 1 faces.

The actual construction of the projector mounting is shown more clearly in Fig. 4. Here the arrow indicates the direction of the directional axis of the projector when in the position shown in the drawing. The spherical dome surrounding the projector is preferably made in two parts with a heavy back part 26 and a central sound transparent front part 27. The two parts are put together at such an angle that substantially the full sound beam can be transmitted from a horizontal to a downward direction as the projector is tilted. The whole dome is preferably filled with a sound-conducting liquid which may expand up into the hollow part of the shaft 4. Cable 116 for energizing the projector may also be led up through the shaft 4. As shown in Fig. 4 the arcuate gear 12 which operates to tilt the projector may conveniently be fastened to the projector by means of a bracket 30. Stops 28 and 29 are provided to limit the upward and downward angles of tilt of the projector. The projector is preferably carefully balanced so that only a small torque is required to turn it.

The tilt control and indicating system is shown in greater detail in Figs. 5 to 8. As shown in these figures, the arrangement is somewhat modified from that shown in Fig. 1 in order to avoid the necessity of a separate rotating table, although control can still be exercised at a remote point. Referring first to Figs. 5 and 6, a flange 31 is secured to the upper part of the projector shaft 4 and is mounted to rotate on ball bearings 32 supported on a non-rotating yoke 33. Secured to the flange 31 is an extension 34 of the shaft 4 which carries at its upper end a platform or table 35 upon which is mounted a frame 36. The upper end of the shaft 4 is provided with a packing 37. In this figure the rotating gear for the shaft 4 has been omitted but it will be understood that an arrangement similar to that schematically shown in Fig. 1 may be used. The projector tilt shaft 10 extends through the tube 34 and is connected through flexible coupling 72 to a gear 38 which meshes with pinion gear 39 driven by the tilt motor 40 energized by the self-synchronous generator 41, which is operated by the handwheel 42 in Figs. 7 and 8.

Also mounted on the shaft 10 is a gear 43 which meshes with a gear 44 on the shaft of a self-synchronous transmitting generator 45, which is connected electrically to a self-synchronous receiving motor 46 shown in Fig. 8. Also mounted on the table 35 is another self-synchronous transmitting motor 47 on whose shaft is mounted a compound pendulum 48. This is conveniently made in the form of an eccentrically mounted disc. The axis of rotation of the disc 48 and the motor 47 is so mounted on the table 35 as to be parallel to the tilting axis 2 of the projector. The self-synchronous motor 47 is electrically connected to the self-synchronous receiving motor 49 which appears in Fig. 8. It will be evident from the above that the motor 45 will transmit indications of the actual angle of tilt of the radiating face of the projector with respect to the ship. On the other hand, the self-synchronous transmitter 47 will transmit indications of the component of roll of the ship in the azimuthal direction into which the projector's directional axis may have been turned.

These indications are repeated by the receiving motors 46 and 49, respectively, shown in Figs. 7 and 8, which depict the tilting control and indicating apparatus. Fig. 7 shows the handwheel 42 for controlling the tilt of the projector as has already been referred to. The handwheel shaft is journaled in the outer casing 50 and is directly connected to the transmitting self-synchronous motor 41. There is also mounted on the handwheel shaft a gear 51 which meshes with another gear 52 mounted on a shaft 53 which is also journaled in the casing 50. The shaft 53 carries an inertia weight 54 to limit the rate at which the handwheel 42 can be turned. At the left of the handwheel 42 there is mounted a tilt indicator. This comprises a fixed dial 55 graduated in degrees of tilt, preferably degrees of tilt of the projector's directional axis with respect to the ship. Around the dial 55 moves a pointer 56. The pointer 56 is painted on an annular rotatable disc 63 affixed to the shaft 57 journaled in bearings 64 mounted in sleeve 65 secured to a frame 66, which, in turn, is supported from the casing 50. The shaft 57 is driven through gears 58 and 59 by the receiving self-synchronous motor 46 which, as above mentioned, is operated by the transmitting motor 45 in Fig. 5. Outside of the pointed 56 there is mounted concentrically a rotatable annular dial 60. The hub 61 of the dial 60 is journaled on the bearings 62, mounting on the outside of the sleeve 65. The hub 61 carries a gear 67 which meshes with gear 68 mounted on the shaft of the self-synchronous receiving motor 49 which is energized by the transmitting generator 47 in Fig. 6. It will now be evident that the pointer 56 will indicate with respect to the inner dial 55 the angular inclination of the face of the projector or of the projector's directional axis with respect to the ship and that the pointer 56 will indicate on the outer dial 60 the angular bearing of the face of the projector with respect to the vertical plane or preferably the angular bearing of the directional axis of the projector with respect to the horizon.

It will also now be evident that by rotating the handwheel 42 the operator can keep the pointer 56 at any desired point on the dial 60 and thereby keep the projector's directional axis inclined at any desired angle with respect to the horizontal.

While the arrangement just described gives a true indication of the inclination of the directional axis of the projector, this is not always sufficient, especially in echo ranging systems in which it is also necessary to know the true directional bearing of the projector's directional axis in azimuth. When the ship rolls, the azimuthal bearing of the projector changes by an amount dependent upon the angle to which the projector has been tilted. For example, with the projector tilted so that its directional axis normally makes an angle of 60 degrees with the horizontal, there may be a variation of over 24 degrees in the azimuthal bearing of the directional axis when the ship rolls 15 degrees. Compensation must, therefore, be introduced into the azimuthal bearing indicator system. According to the invention, this is accomplished by means of the modification shown in Figs. 9, 10 and 11. In this modification a flange 31 secured to the projector shaft 4 is mounted on ball bearings 32 to rotate upon the non-rotating yoke 33. A table or plate 70 is secured to the flange 31 to rotate with it. Mounted on the table 70 is a frame 71' on which the self-synchronous tilt repeater 45 is mounted. The table 70 also carries another frame or bracket formed of two curved upright members 81 joined at their upper end by a plate 82. This plate supports the projector-tilting motor 40 by its feet 84.

As in the preceding modification, the motor 40 is connected to the shaft 10 through gears 38 and 39 and flexible coupling 72. Similarly, the shaft 10 is also connected through gears 43 and 44 to the tilt repeater self-synchronous generator 45. The repeater generator 47 together with its eccentric disk 48 are also conveniently mounted on the frame 81. As in the preceding modification, this arrangement serves to transmit indications of the component of roll of the ship in the direction into which the directional axis of the projector may have been turned.

An additional self-synchronous transmitting generator 115 is mounted at the top of the frame 80. This frame is fixed to the yoke 33 by the bolts 79 and the stator winding of 115 is thus fixed to the ship. If the radiating face of the projector were always maintained in a vertical plane, so that the projector's directional axis were always in a horizontal plane, the rotor of the self-synchronous generator 115 could be directly connected to the shaft 4 and would at all times transmit the correct azimuthal bearing of the projector. Since, however, the projector may be tilted with its radiating face out of the vertical plane, the azimuthal bearing so transmitted would be in error whenever the ship rolls and whenever the projector was turned azimuthally in any direction other than with the projector's directional axis directly to port or to starboard. According to the invention the rotor of the device 115 is therefore connected to the shaft 4 through a compensating device which will now be described.

At one end of the shaft of the tilt repeater generator 45 there is mounted a bevel gear 73 which meshes with bevel gear 74 mounted on a shaft 75 journaled in bearings 78 supported by frame 71'. The shaft 75 also carries an intermittent gear 85 which meshes with another intermittent gear 86. In the surface of gear 86 are mounted two parallel rods 87 and 88 which rotate with the gear 86. Further reference to these will be made later.

A pendulum 76 is mounted for oscillation about an axis at right angles to the axis of tilt of the projector. For this purpose the upper end of the pendulum 76 is made bifurcated, one fork carrying a short shaft 89 which is journaled in the bearing 90 supported by the frame 71' and the other fork carrying a short shaft 77 journaled in bearing 91 mounted in the plate 83. The amplitude of oscillation of the pendulum 76 is thus a measure of the component of roll of the ship in a plane which is at right angles to the vertical plane containing the directional axis of the projector.

Mounting on the shaft 77 so as to rotate with it is a U-shaped bracket 92. Journaled by its ends in the ears of the bracket 92 is a cylinder 93. A symmetrical fork 94 is radially mounted by its shank in the cylinder 93, in such a way that the symmetrical axis of the fork at the point of its intersection with the axis of the cylinder 93 also intersects the axis extended of the shaft 77. The two pins or rods 87 and 88 which are mounted in the gear 86, as above described, engage the shank of the fork. The gears 85 and 86 are made intermittent so that the rods 87 and 88 cannot become disengaged from the fork. Thus one component of motion of the fork 94 is determined by the pendulum 76 and the second component of motion of the fork is determined by the angle of tilt of the projector. A bar 95, rectangular in cross section, is supported in rectangular apertures in two brackets 96 and 97 mounted on the plate 83. The mounting of the bar 95 is so arranged that it is free to slide along its length. A rod 98 is fixed to the bar 95 at right angles to the longitudinal axis of the latter. The rod 98 engages by its lower end the fork 94 and by its upper end another fork 99 which is mounted at right angles to the shaft 100 of the rotor of self-synchronous transmitting generator 115. The gears 85 and 86 are made intermittent so that the fork 94 will not disengage the rod 98 even though the projector is tilted so that its directional axis is vertically downwards, in which case azimuthal bearing is, of course, of no interest. From the above it will be evident that the oscillations of the fork 94 due to the oscillations of the pendulum 76 are modified in amplitude by the position of the gear 86, that is, by the position into which the projector has been tilted.

The position of the rotor of generator 115 is initially determined by the position of the projector in azimuth, but this is modified by the angle to which the projector has been tilted and also by the component of roll of the ship as adjusted for the azimuthal bearing of the projector. The self-synchronous generator 115 will therefore transmit to a suitable self-synchronous receiver motor driving a suitable indicator the correct azimuthal bearing of the projector with respect to the fore and aft line of the ship. Such a bearing indicator may be similar to the tilt indicator shown in Figs. 7 and 8. In conjunction with a gyro compass bearing repeater the bearing indicator may indicate the absolute bearing in azimuth of the projector's directional axis in addition to its relative bearing with respect to the ship.

A complete bearing and tilt indicator system is shown schematically in Fig. 12. So far as practicable, the various elements in this figure have been given the same reference numerals as in Figs. 7 to 11. The projector 1 through its shaft 4 is rotated or trained in azimuth by motor 101 supplied with power from the power device 102 which is controlled from a remote operating station by the handwheel 103. The correct bearing of the projector with respect to the ship is transmitted through the bearing compensating mechanism 117 by self-synchronous generator 115 to self-synchronous receiving motor 104 which operates the pointer 105 on the bearing indicator. A stationary scale 106 suitably calibrated in degrees is provided so that the pointer 105 indicates on the scale the true relative bearing of the projector's directional axis with respect to the ship. A gyro compass repeater device 107 may be employed to rotate an annular scale 108 surrounding the pointer 105, this scale being also calibrated in degrees, so that the pointer 105 on the scale 108 indicates the absolute azimuthal bearing of the projector's directional axis. The tilt indicator is similar to that shown in Figs. 7 and 8, the actual angle of tilt of the projector's directional axis with respect to the ship being transmitted by the transmitter 45 to the receiver motor 46 which operates the pointer 56 with respect to the dial 55. Similarly the transmitter 47 transmits an indication of the variation in the true horizon caused by roll of the ship, taking into account the azimuthal direction into which the projector may have been turned. The indication from transmitter 47 is conducted to receiver motor 49 which rotates the scale 60, indicating in conjunction with the pointer 56 the true inclination of the projector's directional axis with respect to the horizon.

While I have described my invention with particular reference to an underwater compressional wave projector mounted on a ship, it will be understood by those skilled in the art that my invention can equally well be applied to any device having a directional characteristic and mounted on a ship in such a manner that it can be directed at various angles with the horizon and rotated in azimuth; among examples of such other devices the following may be mentioned: directional radio transmitting and/or receiving antennae, searchlights, guns, etc.

Having now described my invention, I claim:

1. In combination, a directional submarine signaling projector, means for mounting said projector on a ship, means for inclining said projector at selected angles to a normally horizontal plane of the ship, and means for indicating the true inclination of the projector to the earth's horizontal plane irrespective of rolling of the ship.

2. In combination, a directional submarine signaling projector, means for mounting said projector on a ship, means for inclining said projector at selected angles to a normally horizontal plane of the ship, and means for indicating the true inclination of the projector to the horizontal irrespective of rolling of the ship, said indicating means including pendulum-controlled means for indicating the true horizon with respect to the ship, and means for indicating the projector's inclination with respect to the ship, said last means cooperating with said pendulum-controlled means for indicating the projector's inclination with respect to the true horizon.

3. In combination, a directional submarine signaling projector, means mounting said projector on a ship, means for inclining said projector at selected angles to the horizontal, means for rotating said projector about a normally vertical axis and means for indicating the true inclination of the projector with respect to the horizontal irrespective of rolling of the ship including a pendulum and indicator means controlled thereby, means mounting the pendulum on the ship, means controlled by rotation of the projector about the vertical axis for maintaining the axis of oscillation of the pendulum parallel to the inclination axis of the projector and further indicating means cooperating with said pendulum-controlled indicator means for indicating the projector's inclination with respect to the ship.

4. In combination, a submarine signaling projector adapted to be mounted on a ship, means for continuously indicating the true inclination of the projector with respect to the horizon, and manually controlled means for varying the projector's inclination with respect to the ship to maintain a substantially constant predetermined inclination of the signaling direction with respect to the horizon.

5. In combination, a submarine signaling projector adapted to be mounted on a ship, means for continuously indicating the inclination of the projector with respect to the ship, means for continuously indicating the inclination of the ship in the signaling direction with respect to the horizon, said two indicating means being conjointly positioned, and manually controlled means for varying the projector's inclination with respect to the ship to maintain a substantially constant predetermined inclination of the signaling direction with respect to the horizon.

6. In combination, a directional submarine signaling projector, a rotatable hollow shaft, means mounting the same on a vessel extending through the vessel's skin, pivot means mounting the projector at the lower end of said shaft for rotation with said shaft and about said pivot, the latter having its axis perpendicular to the shaft's axis, a frame mounted on the upper end of said shaft and rotatable with it, a pendulum free to oscillate about a single axis mounted on said frame with said axis in a plane parallel to said pivot's axis, and means for conjointly indicating the inclination of the projector with respect to the ship and the inclination of the pendulum with respect to the ship, whereby an indication is obtained of the inclination of the projector with respect to the horizon.

7. In an echo ranging system, a signaling device having a directional signaling axis, means mounting said device on a ship, means for varying the inclination of said axis with respect to the ship, and an indicator including a first scale, an index adjacent said scale, a second scale adjacent said index and means for moving said index relatively to said first scale in accordance with the inclination of said axis with respect to the ship and means for moving said second scale relatively to said index in accordance with inclinations of the ship with respect to the horizon as measured in the vertical plane passing through said directional axis.

8. In combination, a signaling device having a directional signaling axis, means mounting said device on a ship, means for rotating said signaling axis in azimuth, means for inclining said signaling axis at selected angles to the horizon and means for indicating the true azimuthal bearing of said axis irrespective of rolling of the ship, said last-named means including indicating means responsive to the azimuthal bearing of said axis relative to the ship, and compensating means for correcting said bearing in accordance with the angle of tilt of said axis and the component of roll of the ship in the azimuthal direction of said axis.

9. In combination, a signaling device having a directional signaling axis, means mounting said device on a ship, means for rotating said signaling axis in azimuth, means for inclining said signaling axis at selected angles to the horizon, and means for indicating the true azimuthal bearing of said axis irrespective of rolling of the ship, said last-named means including a pendulum free to oscillate about a single axis, said pendulum being mounted on the ship so that its oscillation axis is at all times maintained in the same or a parallel plane with the plane containing said directional signaling axis, means connected to said pendulum and adapted to produce a mechanical motion proportional to the oscillations of said pendulum, means adapted to produce a mechanical motion proportional to the inclination of said signaling axis with respect to the ship, means adapted to produce a mechanical motion proportional to the rotation in azimuth of said signaling axis with respect to the ship, and means for producing an indication which is the resultant of said three mechanical motions.

10. In combination with a ship capable of varying its axes with respect to a normal earth's level, a signaling device having a directional signaling axis, means mounting said device on said ship, means for rotating said signaling device to rotate said axis in azimuth, means for inclining said signaling device to rotate said axis at desired angles to the horizon, means adapted to produce an electrical variant proportional to a component of the angular displacement of said ship from a horizontal plane, said last means being mounted so as to rotate as a whole in azimuth with said signaling device, means adapted to produce an electrical variant proportional to the inclination of said signaling axis with respect to the ship, means including a portion of said last named means adapted to produce an electrical variant proportional to the azimuthal direction of said signaling axis with respect to the ship, and indicating means operated by said electrical variants.

11. In combination, a signaling device having a directional signaling axis, means mounting said device on a ship; means for rotating said signaling axis in azimuth; means for inclining said signaling axis at desired angles to the horizon; means for indicating the true inclination of said signaling axis with respect to the horizon; said last-named means including means responsive to the inclination of said signaling axis with respect to the ship, means responsive to the component of inclination of the ship with respect to the horizon, and means operated by said two last-named means; and means for indicating the true azimuthal bearing of said directional axis; said last-named means including means responsive to the azimuthal bearing of said axis relative to the ship, means responsive to the angle of inclination of said axis with respect to the ship, means responsive to the component of inclination of the ship with respect to the horizon in the azimuthal direction of said axis, and means operated by said three last-named means.

12. In an echo ranging system which includes a signaling device having a directional signaling axis, means mounting said device on a ship, means for varying the inclination of said signaling device to vary the direction of said axis with respect to the ship, and means for varying the azimuthal bearing of said signaling device to vary the direction of said axis with respect to the ship, the combination comprising an indicator including a first scale, an index adjacent said scale, a second scale adjacent said index and means for moving said index relatively to said first scale in accordance with the azimuthal bearing of said signaling axis relative to the normal horizontal position of the ship and means for moving said second scale relatively to said index in accordance with azimuthal changes of the position of said ship.

13. In a signaling system on a ship capable of varying its axes with respect to a normal earth's level, said system including a signaling device having a directional axis, means mounting said device on said ship, means for rotating said signaling device to rotate said axis in azimuth, and means for inclining said signaling device to rotate said axis in a vertical plane into desired angles to the horizon, the combination of means adapted to produce an electrical variant proportional to a component of the angular displacement of said ship from a horizontal plane, said last means being mounted so as to rotate as a whole in azimuth with said signaling device, means adapted to produce an electrical variant proportional to the inclination of said signaling axis with respect to the ship, and indicating means individually operated by said electrical variants and cooperating with each other to indicate the position of said directional axis with respect to the horizon.

14. In combination with a vessel, a directional projector for transmitting and receiving a beam of wave energy, means mounting said projector on said vessel, means for rotating said projector about a normally vertical axis and means for tilting said projector in its rotation at an inclination to said normally vertical axis and means indicating the true inclination of said projector to the horizontal irrespective of the inclination of the vessel, said indicating means including means responsive to deviation of said normally vertical axis from the true vertical, means responsive to operation of said rotating means and means responsive to operation of said tilting means.

15. In combination with a vessel, a directional projector for transmitting and receiving a beam of wave energy, means mounting said projector on said vessel, means for rotating said projector about a normally vertical axis and means manually controlled for tilting said projector in its rotation at an inclination to said normally vertical axis and means indicating the true inclination of said projector to the horizontal irrespective of the inclination of the vessel, said indicating means including means responsive to deviation of said normally vertical axis from the true vertical, means responsive to operation of said rotating means and means responsive to operation of said tilting means.

16. In combination with a vessel, a directional projector for transmitting and receiving a beam of wave energy, means mounting said projector on a vessel, means for rotating said projector in azimuth about a normally vertical axis, means for rotating said projector about a normally horizontal axis, means responsive to deviation of said normally vertical axis from the true vertical, means responsive to operation of said first rotating means and means responsive to the operation of said second rotating means and means for indicating the true inclination of said projector with respect to said normally vertical axis and the true azimuthal position of the projector referred to the horizontal plane, both irrespective of the inclination of the vessel said indicating means being operated conjointly by said three last named means.

17. In combination, a signaling device having a directional signaling axis, means for mounting said device on a ship, capable of varying its axes with respect to a horizontal plane, means for rotating said device to rotate said signaling axis in azimuth in a normally horizontal plane of the ship, means for inclining said signaling device to incline said signaling axis at desired angles to said normally horizontal plane of the ship, means responsive to the operation of said rotating means, means responsive to the operation of said inclining means, means responsive to a component of the deviation of said normally horizontal plane of the ship from the true horizontal and means operated by said last three named means adapted to produce a physical response having a direction and magnitude corresponding to the direction and magnitude of the deviation of said signaling axis from said desired angles to the true horizontal.

18. In combination, a signaling device having a directional signaling axis, means for mounting said device on a ship capable of varying its axes with respect to a horizontal plane, means for inclining said projector to incline said signaling axis at desired angles to the normally horizontal plane of a ship, means responsive to operation of said inclining means, means responsive to the component of the deviation of said normally horizontal plane of a ship from the true horizontal referred to the azimuthal direction of said signaling axis, and means operated by said last two named means for producing a physical response having a direction and magnitude corresponding to the direction and magnitude of the deviation of said signaling axis from said desired angles to the true horizontal.

19. In combination with a vessel, a directional projector for transmitting and receiving a beam of wave energy, means mounting said projector on said vessel, means for inclining said projector at selected angles to a normally horizontal plane of the vessel and means for indicating the true inclination of the projector to the earth's horizontal plane irrespective of the position of the vessel with respect to the earth's horizontal plane, said indicating means including means responsive to deviation of said normally horizontal plane from the earth's horizontal plane and means responsive to operation of said inclining means.

ROBERT LONGFELLOW WILLIAMS.

REFERENCES CITED

The following references are of record in the file of this patent:

UNITED STATES PATENTS

| Number | Name | Date |
|---|---|---|
| 1,360,664 | Miller | Nov. 30, 1920 |
| 1,695,483 | Dawson et al. | Dec. 18, 1928 |
| 1,379,506 | Akemann | May 24, 1921 |
| 2,018,497 | Kuntze | Nov. 5, 1935 |
| 1,483,489 | Sperry et al. | Feb. 12, 1924 |

FOREIGN PATENTS

| Number | Country | Date |
|---|---|---|
| 644,117 | Germany | Apr. 24, 1937 |